July 25, 1933. J. S. THOMPSON 1,919,967
FRICTION BLOCK
Filed April 13, 1927  2 Sheets-Sheet 1
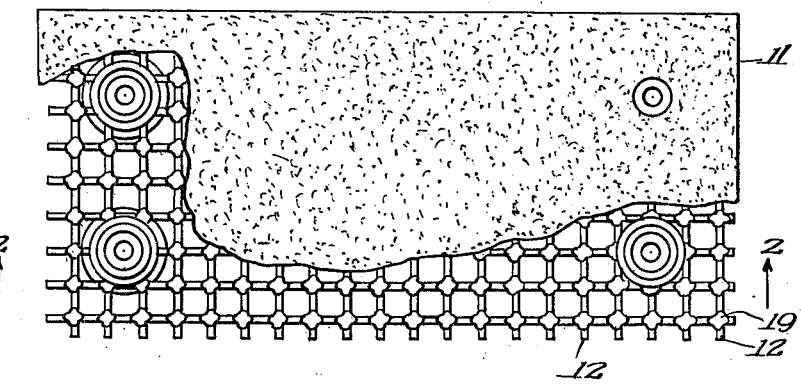
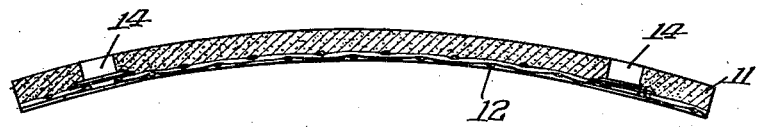
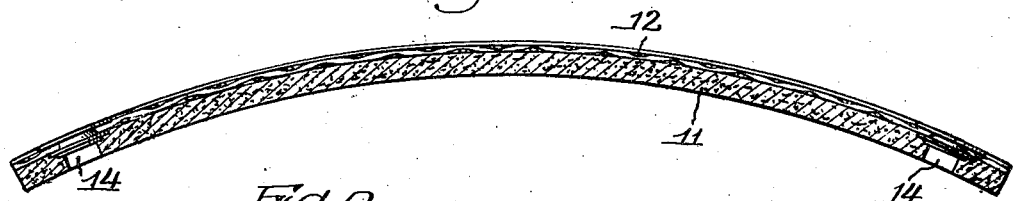
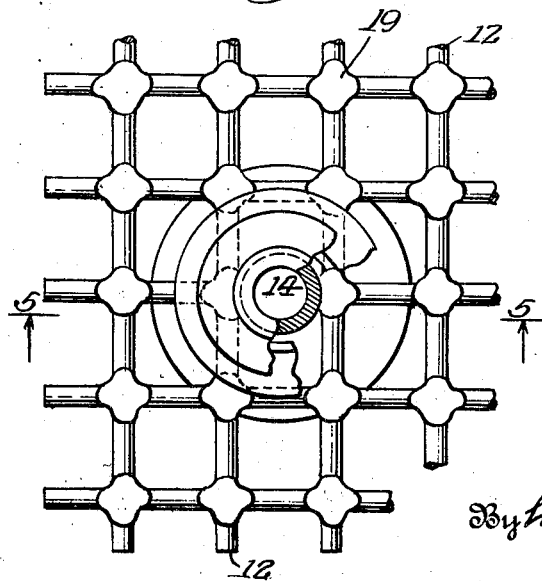
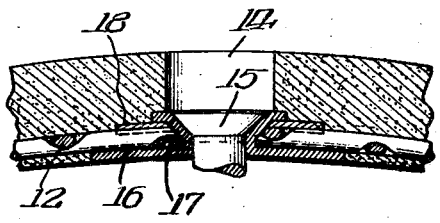
Inventor
James S. Thompson
By his Attorney July 25, 1933.   J. S. THOMPSON   1,919,967
FRICTION BLOCK
Filed April 13, 1927    2 Sheets-Sheet 2

Inventor
James S. Thompson
By his Attorney

Patented July 25, 1933

1,919,967

UNITED STATES PATENT OFFICE

JAMES S. THOMPSON, OF NEW YORK, N. Y., ASSIGNOR TO AMERICAN BRAKEBLOK CORPORATION, OF NEW YORK, N. Y., A CORPORATION OF NEW YORK

FRICTION BLOCK

Application filed April 13, 1927. Serial No. 183,380.

This invention relates generally to friction brakes and more particularly to the provision of a novel block or shoe for braking a moving member by frictional contact therewith. There are many different kinds of brake assemblies in which a block or shoe of this type may be employed, including internal expanding and external contracting brakes for automotive vehicles.

The object of this invention is to provide a novel and efficient friction block which can be made in a form and a size adapted for a friction brake assembly and easily and quickly secured in rigid position therein.

Another object of the invention is to provide a friction block comprising a composition body mounted upon and securely anchored to a reticulated metal back which provides a support for the body and also a means whereby the body may be securely mounted upon a head or a band or other member of a brake assembly.

And a further object of the invention is to provide a friction block having a composition body mounted upon and securely anchored to a reticulated metal back and having openings extending through the body and the back to receive means whereby the block may be secured upon a head or band or other support, provision being made to reinforce the back of the block about said openings to provide a rigid and secure anchorage for the fastening means in the block.

In the commercial manufacture of a friction block in accordance with my invention the fastening openings through the block may sever one or more of the strands of the back and a still further object of my invention is to reinforce the back about the fastening openings therethrough to effectively resist all strains to which the back may be subjected by the fastening devices when the block is in service.

In the accompanying drawings I have illustrated the invention in two forms and referring thereto:

Fig. 1 is a plan view and Fig. 2 is a sectional view on the line 2—2 of Fig. 1 showing a form of block for use in an internal expanding brake assembly, a part of the body being broken away in Fig. 1.

Fig. 3 is a longitudinal sectional view of a block which may be used in an external contracting brake.

Fig. 4 is a detail enlarged view of a section of the back, showing the reinforcing eyelet partly in section.

Fig. 5 is a sectional view on the line 5—5 of Fig. 4 and showing the composition body on the back.

Figure 6:
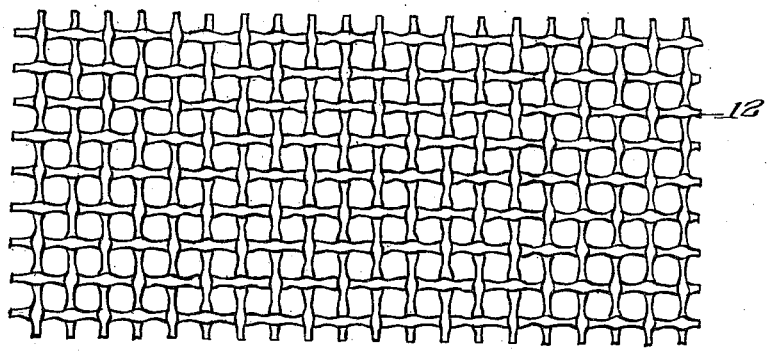
Fig. 6 is a plan view of a wire mesh back.

Referring to the drawings the block comprises a body 11 mounted upon and anchored to a reticulated metal back which may be made of wire mesh 12 or expanded metal 13. The body is made of a suitable composition which will provide friction sufficient for the intended purpose and which is wear and heat resistant. I do not claim the composition in this application because the invention herein claimed is not restricted to the use of a particular composition, but is capable of use with a body formed of any composition suitable for the intended purpose. The back is embedded in the body and rigidly united therewith. This can be accomplished conveniently by inserting the back in a mold and molding the body material thereon under pressure sufficient to force the body material through the interstices of the back and into anchoring engagement with the strands of the back. The back forms a support and carrier for the composition body to which the body is securely anchored against displacement under all usual service conditions, with the edges of the back substantially flush with the sides and ends of the body.

Figure 9:
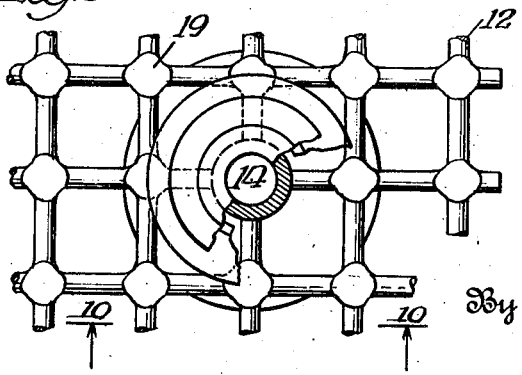
Fig. 9 is a view similar to Fig. 4, but showing the fastening opening intersecting two strands of the wire mesh.

I provide openings 14 which extend through the block to receive rivets 15 or other suitable fastening means whereby the block may be fastened to the head or band or other support of a brake assembly. When an opening 14 registers with an interstice of the reticulated back the fastening rivet will be surrounded by four strands of the back and this will give a rigid anchorage of the rivet with the back and with the block provided the rivet is not too small and the mesh of the back is not too large. But I have found that it will be difficult, if not practically impossible, in the commercial production of blocks embodying the invention to insure that the fastening opening will always register with an interstice of the back. Sometimes a single strand of the back will be severed, as shown in Fig. 4; sometimes two strands of the back will be severed at an intersection, as shown in Fig. 9. In such cases it is apparent that the rivet will not have as efficient anchorage with the block as it would have if the opening registered with an interstice of the back, and in actual service the rivet may work loose in the shoe by breaking down the body until it becomes insecure and possibly breaks loose. It is one of the objects of my present invention to enable the use of a reticulated back for the block because the composition body may be easily and effectively anchored thereto during the molding operation, and it is another object of the invention to provide a secure anchorage between such a block and the means whereby the block is fastened in place in a brake assembly so that the block will be held securely and rigidly in its proper position under all conditions of service. To this end I provide for each fastening opening 14 an eyelet in the reticulated back wherever the opening may be. The eyelet comprises a base 16, a tubular member 17 and a washer 18. The base 16 is located against the outer face of the reticulated back and the washer 18 is located against the inner face of the reticulated back, and the washer is preferably smaller than the base to permit the body material to enter and fill the space between the base and the washer during the molding operation. The tubular member 17 is preferably integral with the base and it projects through the fastening opening 14 in the reticulated back and through the washer 18, and the inner end of the tubular member is clamped or riveted down upon the washer 18. Sufficient pressure is applied in riveting the tubular member, as shown in Figs. 4 and 5, to clamp the base and the washer tightly against the reticulated back so that the strands of the back passing between the base and the washer will be tightly clamped thereby and the rivet as a whole will be held rigid with the back and against possibility of displacement under all conditions of service. This pressure may be sufficient to indent the base and the washer between the strands to clamp the strands rigidly. When the fastening opening registers with an interstice of the back none of the strands of the back will be severed and the eyelet will add to the strength of the back at the fastening opening; when the fastening opening severs a single strand, as in Fig. 4, the eyelet will interlock with the severed ends of that strand and also with other unsevered strands so that it will be rigidly secured to the back and provide a safe anchorage for the rivet; and when the fastening opening severs two strands at an intersection, as shown in Fig. 9, the eyelet will interlock with all the severed ends and with other parts of the back to secure the eyelet rigidly in the back and provide a safe anchorage for the rivet. In fact, the eyelet provides a strong and substantial anchorage for the rivet wherever the fastening opening may pass through the back and it not only supplies necessary strength and reinforcement when strands of the back have been severed, but it also prevents possibility of movement of the strands about the fastening opening which might break down the wall of the opening and loosen the rivet anchorage and permit the block to move relative to its support.

I prefer to flare the tubular portion of the eyelet during the clamping operation to conform with and accommodate the head of the rivet, as shown in Fig. 5, so that the rivet will be countersunk in the eyelet and permit the body of the block to be worn down almost to the back before the rivet head becomes exposed on the wearing face of the block, thus providing a maximum degree of wear for the block. This also tends to provide a more rigid anchorage for the rivet to secure the block in fixed position on its support.

In the practice of my invention I may use for the back a recticulated material of wire mesh or expanded metal or other form and in any gauges and sizes suitable for the purpose. A square wire mesh, as shown in Fig. 1, is a desirable form of back material, but I do not restrict myself to this form or to any mesh or to any gauge.

Figure 7:
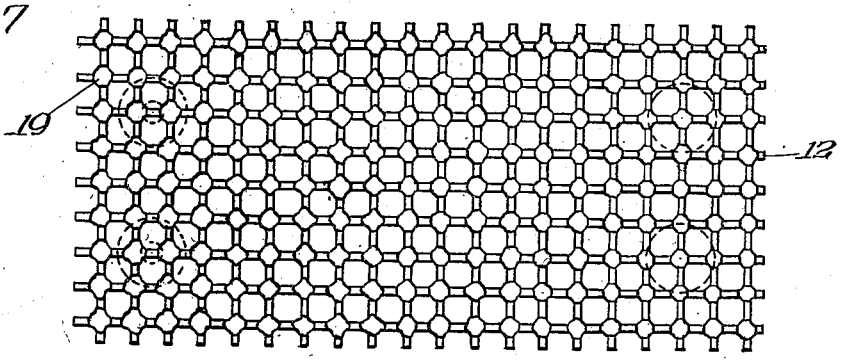
Fig. 7 shows the wire mesh back after it has been galvanized.
Figure 8:
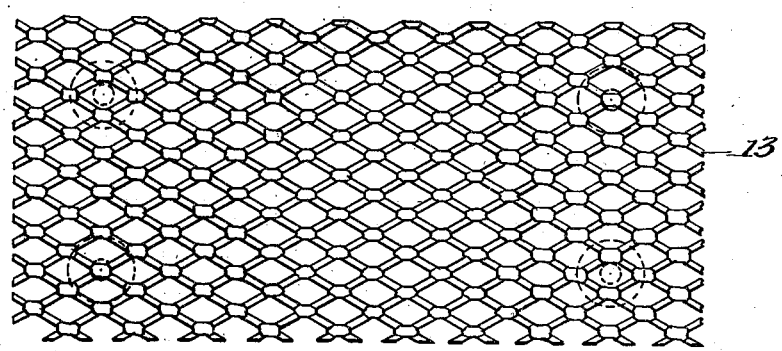
Fig. 8 illustrates a galvanized back made of expanded metal.

It is desirable to maintain the strands of the back in their normal position with relation to each other, and to prevent the material from skewing in handling, and for this purpose I prefer to galvanize the back material in sheets, or after the sheets have been cut up into backs, and also to roll the back to flatten the strands at their intersections. Fig. 6 illustrates a wire mesh reticulated back which has been galvanized and Fig. 7 illustrates the same back after it has been rolled. The galvanizing operation may be performed in the usual way by dipping the back material into a zinc bath and then withdrawing the material and permitting it to drain. The galvanizing coating ties the strands together at their intersections and makes the back material rigid. The galvanizing coating gathers at the intersections and enlarges the area of the back in spots, providing anchoring means, at the intersections to an extent which provides a greater anchorage for the body material than is the case when a galvanizing coating is not applied; and this enlargement may be increased, as indicated in Fig. 7, by rolling the material to flatten it and provide the flat spots 19 with which the body material interlocks. Rolling and flattening the back material also reduces the thickness of the back without lessening its strength or efficiency for use as a back. The galvanizing and rolling and flattening operations are not at all times necessary but, as I have indicated, they make the back material stiff and rigid and are otherwise desirable refinements of the invention.

Figure 10:
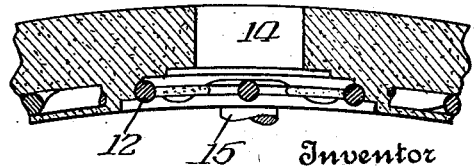
Fig. 10 is a sectional view on the line 10—10 of Fig. 9.

My invention provides a friction block for friction brakes which can be easily and quickly applied and which is adapted to give long and efficient service. The invention is highly important for the automotive industry where friction linings have heretofore been generally used, and in this, as well as in all other uses of the invention, it is desirable to provide for installing and replacing the blocks easily and quickly and for securing the blocks rigidly in operative position. I have accomplished this in the present invention in a simple and efficient manner by anchoring the body upon a recticulated back and by providing means whereby the block may be easily and rigidly secured in place upon a brake head, band or other support. The reticulated back functions as a carrier and support for the body to protect it in handling and in transportation, and it also supplies the anchoring means whereby the block may be rigidly secured to its support. To provide a substantial anchorage for the fastening devices in the block and to guard against possible weakening of the reticulated back in punching the fastening openings I have provided the eyelets for the fastening openings in the back and these eyelets are clamped tightly upon the back and may be indented between the strands of the back. The tubular member of the eyelet is formed under the clamping pressure to receive the rivet head so that it will be located close to the bottom of the fastening opening in the block and at or below the approximate limit of wear of the block so that the rivet head will never contact with the member of the brake assembly to be braked under approved working conditions. My invention provides in a simple, economical and efficient manner for meeting all these requirements of a satisfactory friction block for friction brakes; it can be easily made in sizes and shapes to meet all conditions; and it can be easily and quickly applied, installed and replaced as occasion requires. In the automotive industry the blocks may be made relatively thin, as shown in Figs. 2 and 3, or relatively thick, as shown in Figs. 5 and 10, depending upon the service for which they are intended; and they may be varied in thickness and in other respects to meet the requirements for friction blocks in brake assemblies of all kinds and in other installations where friction blocks are employed. I have indicated in the drawings the use of the invention in friction blocks for automotive vehicles, but I do not restrict myself to this embodiment of the invention and I reserve the right to make all changes in the form, construction and arrangement of parts of the invention which may come within the scope of the following claims.

I claim:

1. A friction block comprising a reticulated back, a composition body anchored on the back, the block having an opening extending through the body and the back to receive a device for fastening the block to a support, and reinforcing means comprising an eyelet and a washer engaging the back around the fastening opening therein.

2. A friction block comprising a reticulated back, a composition body anchored on the back, the block having an opening extending through the body and the back to receive a device for fastening the block to a support, a washer, and an eyelet clamped to the strands of the back and the washer around the fastening opening therein.

3. A friction block comprising a reticulated back, a composition body anchored on the back, the block having an opening extending through the body and the back to receive a device for fastening the block to a support, and an eyelet clamped to the strands of the back around the fastening opening therein, said eyelet comprising a relatively large base and a smaller washer engaging opposite sides of the back.

4. A friction block comprising a reticulated back, a composition body anchored on the back, the block having an opening extending through the body and the back to receive a device for fastening the block to a support, and an eyelet clamped to the strands of the back around the fastening opening therein, said eyelet comprising a relatively large base engaging the outer side of the back and a smaller washer engaging the inner side of the back.

5. A friction block comprising a reticulated back, a composition body anchored on the back, the block having an opening extending through the body and the back to receive a device for fastening the block to a support, and an eyelet clamped to strands of the back around the fastening opening therein, said eyelet comprising a base engaging the outer side of the back and a washer engaging the inner side of the back, the edge of the washer being spaced inwardly from the edge of the base to permit the body material to enter between the base and the washer to make interlocking engagement with the eyelet.

6. A friction block comprising a reticulated back, a composition body anchored on the back, the block having an opening extending through the body and the back to receive a device for fastening the block to a support, and an eyelet clamped to the strands of the back around the fastening opening therein, said eyelet comprising a base and a washer clamped upon the back on the opposite side thereof and indented between strands of the back.

7. A friction block comprising a reticulated back, a composition body anchored on the back, the block having an opening extending through the body and the back to receive a device for fastening the block to a support, and an eyelet clamped to the strands of the back around the fastening opening therein, said eyelet comprising an outer base, a tubular portion and a washer on the tubular portion, the inner end of said tubular portion being expanded and clamped down upon the washer to clamp the back between the base and the washer of the eyelet and the inner end of said tubular portion being formed to provide a seat for the head of a fastening device below the ordinary limit of wear of the block.

8. A friction block comprising a wire mesh back, a composition body anchored on the back, the block having an opening extending through the body and the back to receive a device for fastening the block to a support, and reenforcing means comprising an eyelet and a washer clamped to the wires of the back around the fastening opening therein, the base of the eyelet being of sufficient size to engage at least three wires of the back extending in the same direction.

JAMES S. THOMPSON.